(12) United States Patent
Huang et al.

(10) Patent No.: US 11,424,612 B2
(45) Date of Patent: Aug. 23, 2022

(54) METHOD AND APPARATUS FOR OVER VOLTAGE PROTECTION OF A POWER SYSTEM

(71) Applicant: GE Aviation Systems LLC, Grand Rapids, MI (US)

(72) Inventors: Hao Huang, Troy, OH (US); David Dimitri Karipides, Casstown, OH (US); Roger Dean Thornton, Wapakoneta, OH (US)

(73) Assignee: GE Aviation Systems LLC, Grand Rapids, MI (US)

(*) Notice: Subject to any disclaimer, the term of this patent is extended or adjusted under 35 U.S.C. 154(b) by 268 days.

(21) Appl. No.: 16/843,429

(22) Filed: Apr. 8, 2020

(65) Prior Publication Data
US 2020/0328588 A1   Oct. 15, 2020

Related U.S. Application Data

(60) Provisional application No. 62/834,124, filed on Apr. 15, 2019.

(51) Int. Cl.
| | |
|---|---|
| *H02H 1/06* | (2006.01) |
| *H02P 7/06* | (2006.01) |
| *H02P 9/10* | (2006.01) |
| *H02H 7/06* | (2006.01) |
| *F02N 11/04* | (2006.01) |
| *F02N 11/08* | (2006.01) |
| *H02H 3/08* | (2006.01) |
| *H02H 3/20* | (2006.01) |
| *H02P 101/30* | (2015.01) |

(52) U.S. Cl.
CPC ............. *H02H 7/065* (2013.01); *F02N 11/04* (2013.01); *F02N 11/087* (2013.01); *H02H 3/08* (2013.01); *H02H 3/20* (2013.01); *H02P 9/107* (2013.01); *H02P 2101/30* (2015.01)

(58) Field of Classification Search
CPC ................ H02H 1/06; H02P 9/10; H02P 7/29
See application file for complete search history.

(56) References Cited

U.S. PATENT DOCUMENTS

| | | |
|---|---|---|
| 3,748,555 A | 7/1973 | Hoffman |
| 7,948,218 B2 | 5/2011 | Regazzi et al. |
| 8,232,778 B1 | 7/2012 | Patel |
| 8,927,044 B2 | 1/2015 | Lopez et al. |
| 9,018,889 B2 | 4/2015 | Patel |

FOREIGN PATENT DOCUMENTS

| | | |
|---|---|---|
| CN | 1125496 A | 6/1996 |
| CN | 101350534 A | 1/2009 |
| EP | 1753123 A2 | 2/2007 |
| EP | 2747231 A1 | 6/2014 |
| WO | 9500996 A1 | 1/1995 |

OTHER PUBLICATIONS

European Patent Office, Extended European Search Report re Corresponding Application No. 20169083.1-1202, Aug. 28, 2020, 8 pages, Munich, Germany.

*Primary Examiner* — Muhammad S Islam
*Assistant Examiner* — Charles S Laughlin
(74) *Attorney, Agent, or Firm* — McGarry Bair PC

(57) ABSTRACT

A method and apparatus for operating an overvoltage response for an electric machine includes opening a first switching element and a second switching element in response to an overvoltage condition. In the instance that the overvoltage condition persists, the method and apparatus can further open a third switchable element to cease the overvoltage condition.

20 Claims, 5 Drawing Sheets

METHOD AND APPARATUS FOR OVER VOLTAGE PROTECTION OF A POWER SYSTEM

CROSS REFERENCE TO RELATED APPLICATION(S)

This application claims priority to and benefit of U.S. Provisional Patent Application No. 62/834,124, filed Apr. 15, 2019, which is incorporated herein in its entirety.

TECHNICAL FIELD

The disclosure relates to a method and apparatus for operating an electric machine assembly and more specifically to responding to an overvoltage condition in the electric machine assembly.

BACKGROUND

Electric machines, such as electric motors or electric generators, are used in energy conversion. In the aircraft industry, it is common to combine a motor mode and a generator mode in the same electric machine, where the electric machine in motor mode functions to start the engine, and, depending on the mode, also functions as a generator. Regardless of the mode, an electric machine typically includes a rotor having rotor windings that are driven to rotate by a source of rotation, such as a mechanical or electrical machine, which for some aircraft may be a gas turbine engine. In some instances, the electric machine can unintentionally generate more power than desired or needed. In these instances, the electric machine can employ overvoltage protection or response mechanisms to prevent delivery of excess power to downstream electrical loads.

BRIEF DESCRIPTION

In one aspect, the present disclosure relates to an overvoltage response module for an electric machine, including an input configured to receive a power output value of the electric machine, a first output configured to drive a first switchable element at a first leg of an H bridge and a second output configured to drive a second switchable element at a second leg of the H bridge, the H bridge further including an exciter stator of the electric machine disposed between the first leg and the second leg, a third output configured to drive a third switchable element upstream of the H bridge, a controller module configured to compare the power output value with an overvoltage condition of the electric machine, defining a first comparison, and in response to a determination an overvoltage condition exists based on the first comparison, controllably operate the first switchable element to open, by way of the first output, and the second switchable element to open, by way of the second output, and after a predetermined period of time, compare the power output value with the overvoltage condition of the electric machine, defining a second comparison, and in response to a determination the overvoltage condition exists based on the second comparison, controllably operate the third switchable element to open.

In another aspect, the present disclosure relates to a method of operating an overvoltage response in a power system, the method including receiving a first value representative of a power output of an electric machine, a first comparing of the value with a overvoltage threshold value representative of an overvoltage condition in the electric machine, in response to determining an overvoltage condition exists based on the first comparison, controllably opening a first switchable element at a first leg of an H bridge and controllably opening a second switchable element at a second leg of the H bridge, the H bridge further including an exciter stator of the electric machine disposed between the first leg and the second leg, after a predetermined period of time sufficient to cease current conduction in the exciter stator, receiving an updated value representative of the power output of the electric machine, and a second comparing of the updated value with the overvoltage threshold value representative of the overvoltage condition in the electric machine to ensure the overvoltage condition has ceased.

In yet another aspect, the present disclosure relates to an electric machine assembly, including a power output having a sensor configured to sense the power output, a stator assembly including an H bridge circuit defining a first leg and a second leg, and having an exciter stator disposed between the first leg and the second leg, a first switchable element disposed in the first leg, a second switchable element disposed in the second leg, a third switchable element disposed upstream of the H bridge circuit, a controller module connected with the sensor and configured to compare a sensed power output by the sensor with an overvoltage condition of the electric machine, defining a first comparison, and in response to a determination an overvoltage condition exists based on the first comparison, controllably operate the first switchable element to open and the second switchable element to open, and after a predetermined period of time, compare an updated sensed power output by the sensor with the overvoltage condition of the electric machine, defining a second comparison, and in response to a determination the overvoltage condition exists based on the second comparison, controllably operate the third switchable element to open.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which makes reference to the appended FIGS., in which.

DETAILED DESCRIPTION

Figure 1:
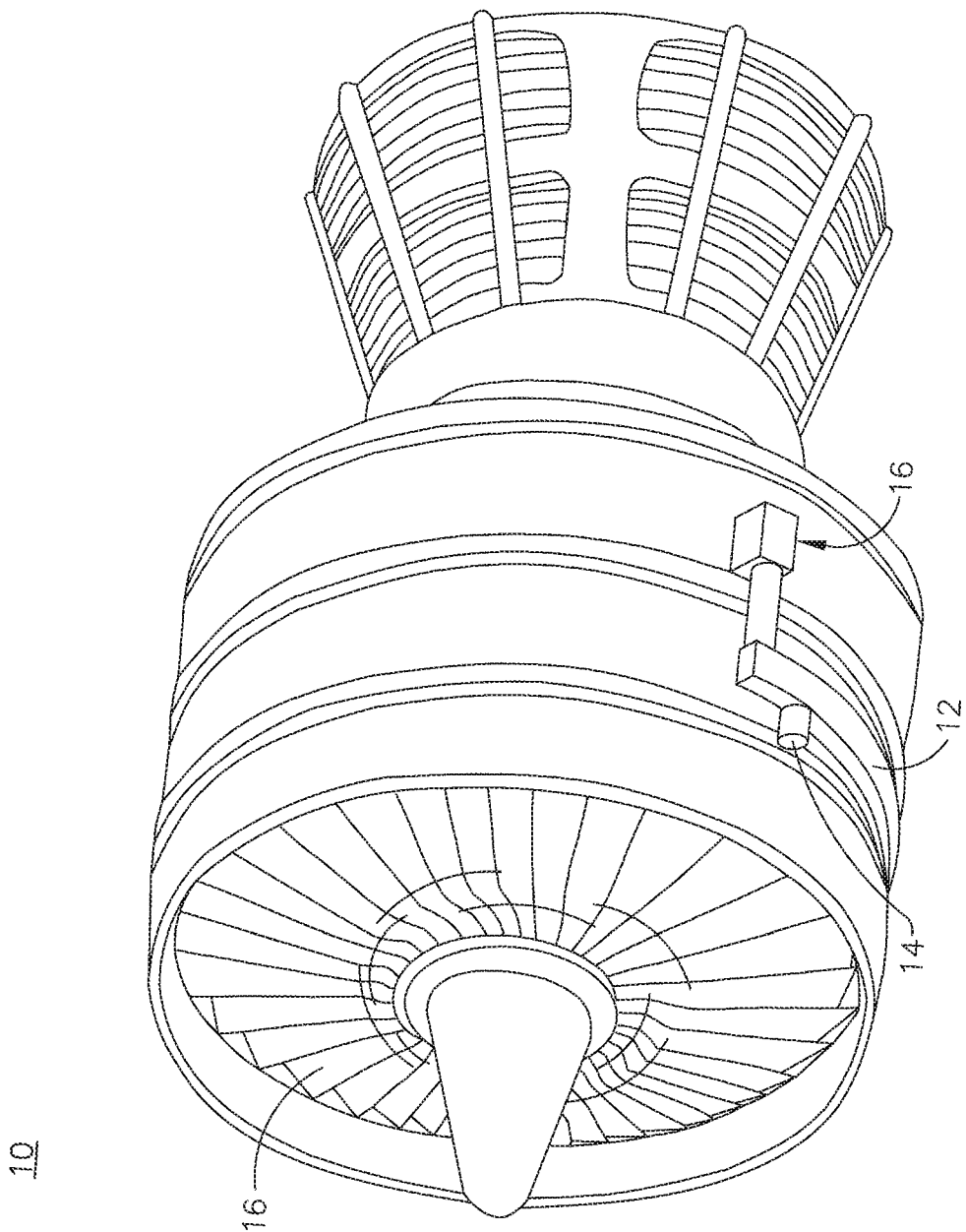
FIG. 1 is an isometric view of a gas turbine engine having a generator, in accordance with various aspects described herein.

Aspects of the disclosure can be implemented in any environment using an electric machine or power generator.

For purposes of this description, such an electric machine will be generally referred to as a generator, an electric machine assembly, or similar language, which is meant to clarify that one or more stator/rotor combinations can be included in the machine. While this description is primarily directed toward an electric machine providing power generation, it is also applicable to an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The disclosure can be implemented in any electrical circuit environment having a switch. A non-limiting example of an electrical circuit environment that can include aspects of the disclosure can include an aircraft power system architecture, which enables production of electrical power from at least one spool of a turbine engine, preferably a gas turbine engine, and delivers the electrical power to a set of electrical loads. One non-limiting example of the switching element can include a solid state switching device, such as a silicon carbide (SiC) or Gallium Nitride (GaN) based, high power switch. SiC or GaN can be selected based on their solid state material construction, their ability to handle high voltages and large power levels in smaller and lighter form factors, and their high speed switching ability to perform electrical operations very quickly. Additional switching devices or additional silicon-based power switches can be included.

Additionally, while terms such as "voltage", "current", and "power" can be used herein, it will be evident to one skilled in the art that these terms can be interrelated when describing aspects of the electrical circuit, or circuit operations.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

As used herein, a "wet" cavity generator includes a cavity housing the rotor and stator that is exposed to free liquid coolant (e.g. coolant freely moving within the cavity). In contrast, a "dry" cavity generator the rotor and stator can be cooled by coolant contained within limited in fluidly sealed passages (e.g. non-freely moving about the cavity).

The exemplary drawings are for purposes of illustration only and the dimensions, positions, order and relative sizes reflected in the drawings attached hereto can vary.

FIG. 1 illustrates a gas turbine engine 10 having an accessory gear box (AGB) 12 and an electric machine or generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein. While a generator 14 is shown and described, aspects of the disclosure can include any electrical machine or generator.

Figure 2:
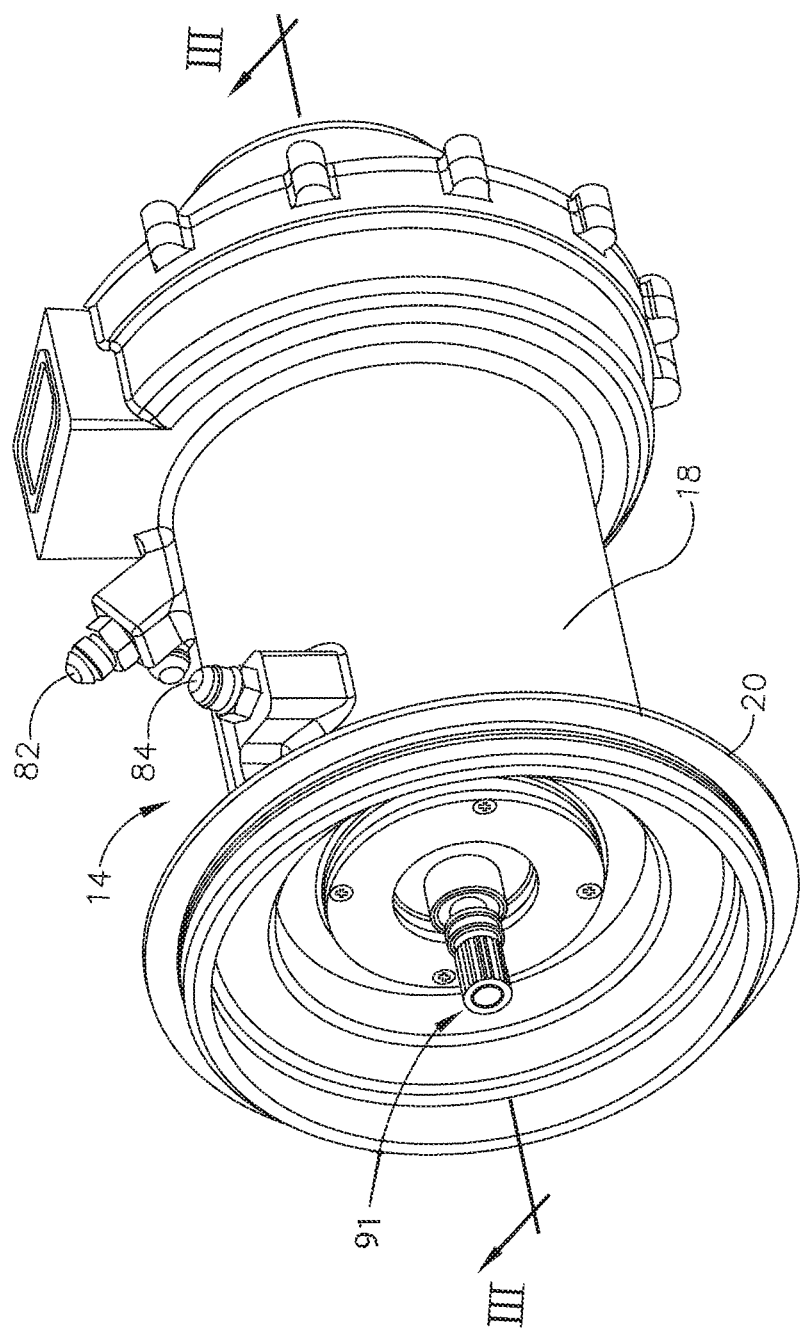
FIG. 2 is an isometric view of an exterior of the generator of FIG. 1, in accordance with various aspects described herein.

FIG. 2 more clearly illustrates a non-limiting example generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet and output ports 82, 84 can be utilized for cooling at least a portion of a rotor or stator of the generator 14. The liquid cooling system can also include a second coolant outlet port 91, shown at a rotatable shaft portion of the generator 14. While not shown, aspects of the disclosure can further include other liquid cooling system components, such as a liquid coolant reservoir fluidly coupled with the cooling fluid inlet port 82, a rotatable shaft coolant inlet port, the cooling fluid outlet port 84, or a generator coolant outlet port, and a liquid coolant pump to forcibly supply the coolant through the ports 82, 84 or generator 14. While a liquid cooling system for a dry cavity generator is shown and described for understanding, aspects of the disclosure are applicable for any wet or dry cavity generator.

Figure 3:
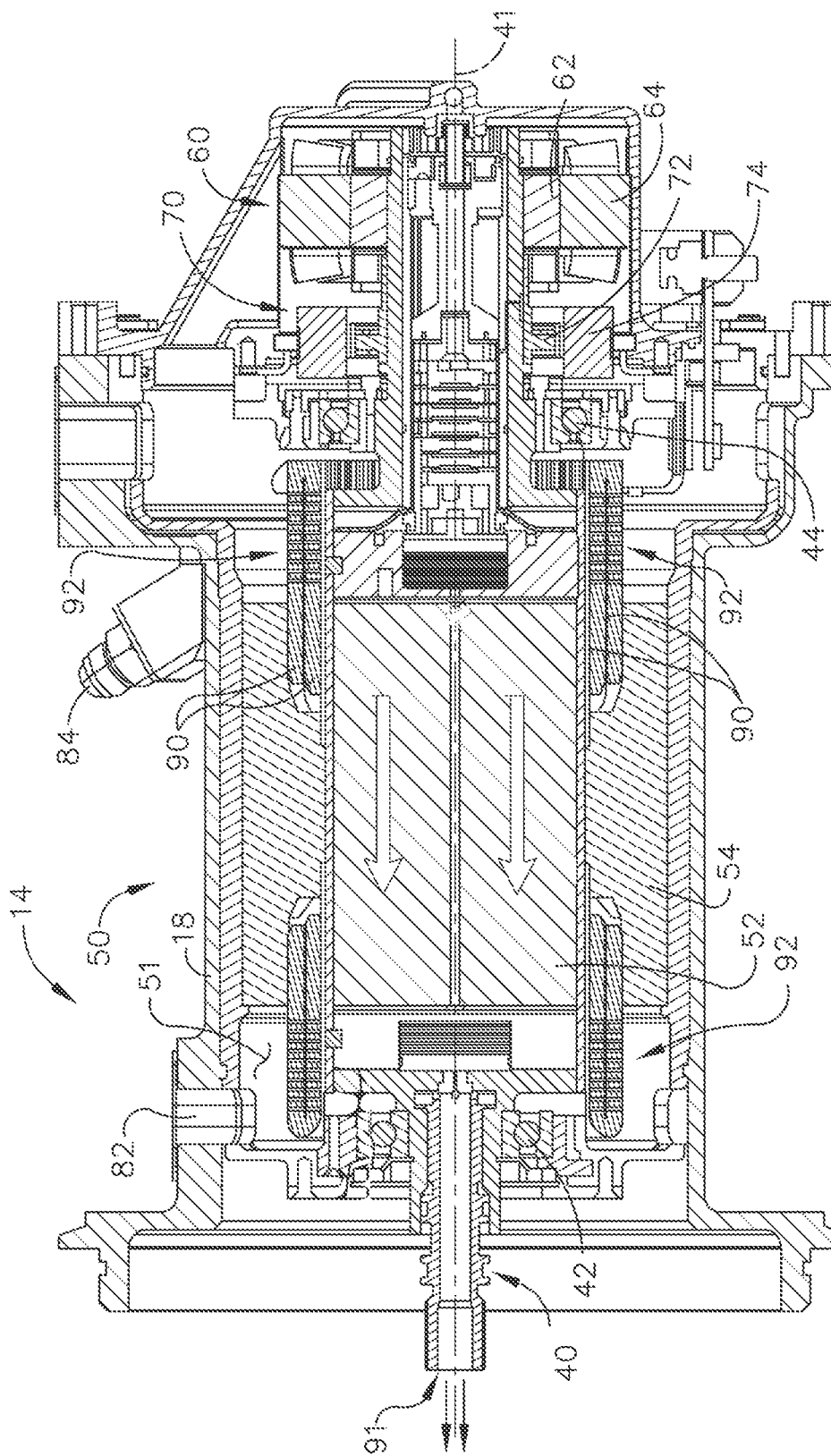
FIG. 3 is a schematic cross-sectional view of the generator of FIG. 2, taken along line III-III of FIG. 2, in accordance with various aspects described herein.

A non-limiting interior of the generator 14 is best seen in FIG. 3, which is a cross-sectional view of the generator 14 shown in FIG. 2 taken along line A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74. In this manner, the main machine rotor 52, exciter rotor 62, and PMG rotor 72 are disposed on and co-rotate with the rotatable shaft 40. The fixed components can be mounted to any suitable part of the housing 18, and include the main machine stator 54, exciter stator 64, and PMG stator 74. Collectively, the fixed components define an interior through which the rotatable shaft 40 extends and rotates relative to.

It will be understood that the main machine rotor 52, exciter rotor 62, and PMG rotor 72 can have a set of rotor poles, and that the main machine stator 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn. Aspects of the disclosure shown include at least one set of stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a main machine stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

During power-generating operations, the rotation of the rotatable shaft 40 relative to the stationary generator 14 components ultimately induces or generates current in the main machine stator windings 90, which is further provided to a generator power output (not shown). The generator power outlet can further supply the generated current to power or energize a set of electrical loads. Specifically, the rotation of a set of permanent magnets affixed to the PMG rotor 72 relative to the PMG stator 74 generates current in the PMG stator that is provided to the exciter stator 64. In turn, the rotation of the exciter rotor 62 relative to the energized exciter stator 64 generates current in the exciter rotor 62 that is further provided to the main machine rotor 52. The rotation of the energized main machine rotor 52 relative to the main machine stator 54 or set of stator windings 90 generates power output current provided to the generator power output, and to a set of electrical loads or an electrical bus.

Figure 4:
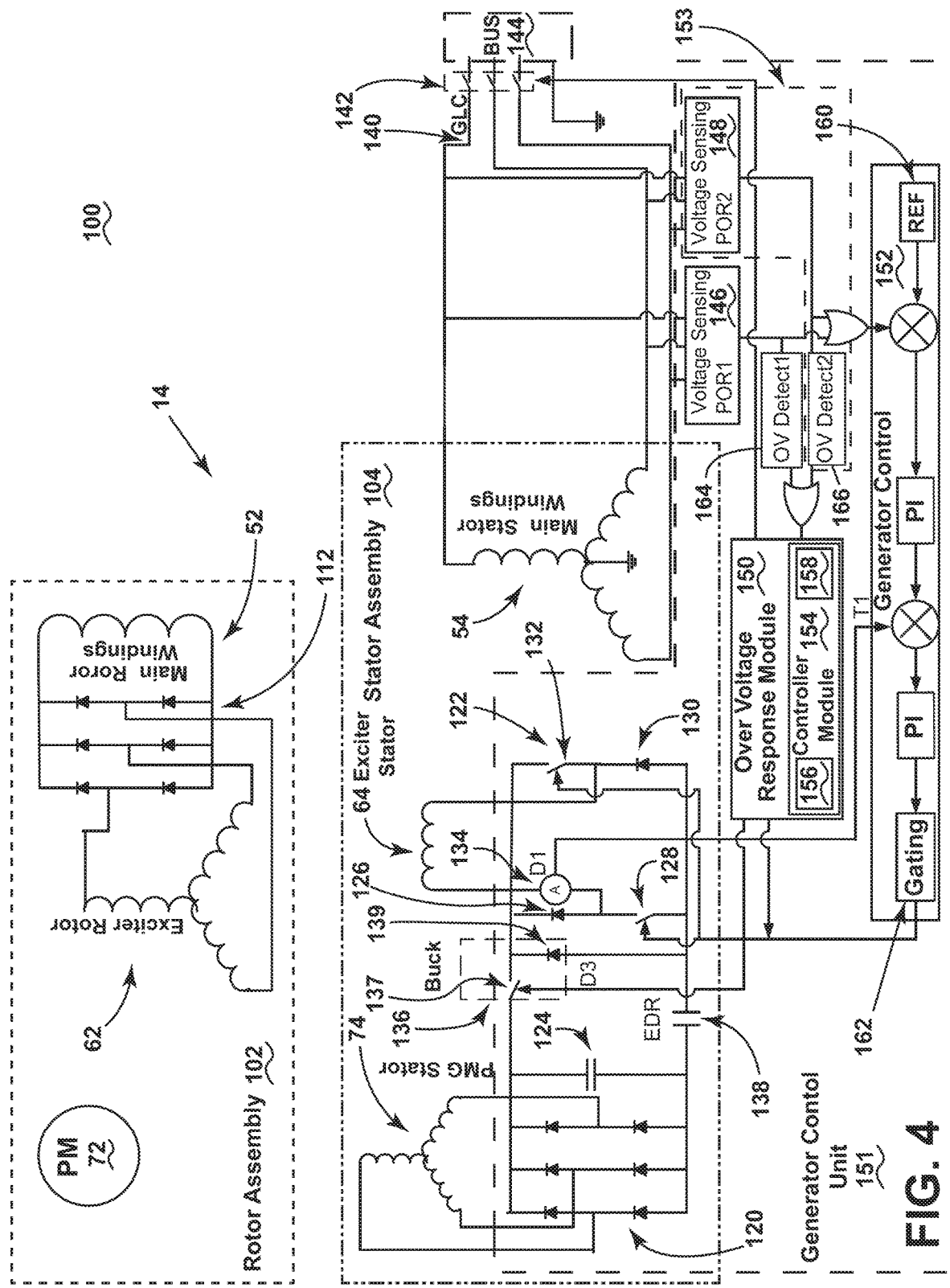
FIG. 4 is a schematic view of a power system including a generator and an overvoltage response system, in accordance with various aspects described herein.

FIG. 4 illustrates a schematic view of a power system 100 including aspects of a generator, one non-limiting example of which is the generator 14 of FIGS. 1-3. As shown, the generator 14 can include a rotor assembly 102 and a stator assembly 104. The rotor assembly is shown schematically including the permanent magnet generator (PMG) rotor 72, the exciter rotor 62, schematically shown as a set of windings, and the main machine rotor 52, also schematically shown as a winding. In one non-limiting example, the rotor assembly 102 is shown to also include a first rectifying diode bridge 112 connected between the exciter rotor 62 output and the main machine rotor 52 input, and configured to rectify alternating current (AC) power, including but not limited to 3-phase power, to a direct current (DC) power provided to the main machine rotor 52. As explained, the rotor assembly 102, or components thereof, can be rotationally coupled or connected by way of a rotatable shaft (not shown).

The stator assembly 104 is shown including the PMG stator 74, schematically shown as a set of windings, the exciter stator 64, schematically shown as a winding in an "H" bridge 122 configuration, and the main machine stator 54, schematically shown as a set of windings. In one non-limiting example, the stator assembly 104 is shown to also include a second rectifying diode bridge 120 connected between the PMG stator 74 output and the exciter stator 64 or the H bridge 122 input, and configured to rectify AC power, including but not limited to 3-phase power, to DC power provided to the exciter stator 64. An optional capacitor 124 is shown disposed across the second diode bridge 120 output.

The H bridge 122 includes a series arrangement of a first diode 126 and a first switchable element 128 defining a first leg of the H bridge 122 and a series arrangement of a second diode 130 and a second switchable element 132 defining a second leg of the H bridge 122. The exciter stator 64 windings are shown disposed between the first and second legs of the H bridge 122, connected at nodes between the respective diode 126, 130 and switchable element 128, 132 arrangements. In one non-limiting example configuration, the main machine stator 54 can include a power output 140 connected with an electric power bus 144, by way of a contactor or switch, shown as a generator line contactor (GLC) 142. The electric power bus 144 can further be connected to a set of energizable electrical loads.

In yet another non-limiting example, the stator assembly 104 can also include a buck converter 136 positioned between the PMG stator 74 output (including, but not limited to downstream of the second diode bridge 120) and the H bridge 122. The buck converter 136 can include a third switchable element 137 and a buck freewheeling diode 139 positioned across the DC output of the second diode bridge 120. In yet another non-limiting example, the stator assembly 104 can include a physical connection switch, such as a relay, contactor, or the like, and shown as an exciter disconnect relay (EDR) 138. The EDR 138 can also be positioned between the PMG stator 74 output (including, but not limited to downstream of the second diode bridge 120) and the H bridge 122. While the buck converter 136 and EDR 138 are shown positioned at opposing upper and lower portions of the DC current conductors between the PMG stator 74 output and the H bridge 122, non-limiting aspects of the disclosure can be included where either the buck converter 136, the EDR 138, or a combination thereof can be positioned in any permutation of the upper or lower conductors, including positioning both elements 136, 138 on either the upper or lower conductor.

In one non-limiting example, the first, second, and third switchable elements 128, 132, 137 can include solid state switchable elements, while the EDR 138 can include an electromechanical relay, contactor, or the like. As used herein, a solid state switchable element can operably open, close, or toggle the state of the switch within 10 microseconds, in less than 0.5 milliseconds, or a similar fast period of time, compared with the electromechanical switch which can operably open, close, or toggle the state of the switch within 15 to 50 milliseconds.

The power output 140 of the generator 14 can be connected a generator control unit (GCU) 151 (shown in dotted outline) having voltage sensors, shown as redundant voltage sensing points of regulation (POR; shown as voltage sensing POR1 146 and voltage sensing POR2 148) configured or adapted to sense or measure the voltage output at the power output 140 lines. The GCU 151 is further shown including a controller module 154 having a processor 156 and memory 158. In one non-limiting example, the second voltage sensing POR2 148 can be included in a distinct or separate over voltage protection unit 153 detection module. Non-limiting aspects of the disclosure can further be included wherein the second voltage sensing POR2 can be including in the GCU 151, or wherein the over voltage protection unit 153 can be included in the GCU 151. As shown, aspects of the stator assembly 104 can also be included when discussing or describing the GCU 151 (and included in the dotted outline of the GCU 151).

The set of voltage sensing POR 146, 148 can provide the sensed or measured voltage, or a signal indicative thereof, to a generator control 152 configured or adapted to control operation of the generator 14. For instance, in one non-limiting example, the generator control 152 can compare the sensed or measured voltage(s) from the one or more redundant voltage sensing POR 146, 148 with a desired or expected reference value 160, and in turn controllably operate the excitation of the exciter stator 64 to ensure the generator 14 power output 140 is in accordance with the reference value 160. The generator control 152 can controllably operate, command, direct, or otherwise instruct the excitation of the exciter stator 64 by way of a gate driver 162 operating the switching operations of the first switchable element 128, the second switchable element 132, or a combination thereof. The generator control 152 can further controllably operate the excitation of the exciter stator 64 based on additional inputs or considerations, such as a current measurement from an example current sensor 134 positioned at the H bridge 122.

The GCU 151 can also include an over voltage response module 150 for operational or functional protection control schemas. The over voltage response module 150 can be configured to detect and respond to an over voltage condition at the power output 140 of the generator 14. As shown, a first over voltage detector (OV detect1) 164 can be associated with the voltage sensing POR1 146 and receive a voltage sensing or measurement from the voltage sensing POR1 146, while a redundant second over voltage detector (OV detect2) 166 can be associated with the voltage sensing POR2 148 146 and receive a voltage sensing or measurement from the voltage sensing POR2 148. Each of the over voltage detectors 164, 166 can be adapted or configured to detect, determine, or based on a comparison (e.g. a first comparison), alert or signal to the over voltage response module 150 that an over voltage condition exists at the power output 140 of the generator 14. The detection of the over voltage condition can be determined or detected by any understood over voltage detection mechanisms. As well-understood, over voltage conditions can harm or damage electrical loads downstream of the power output 140, electric power bus 144, or the like.

In response to the detection of the over voltage condition at the power output 140 by the over voltage response module 150, the over voltage response module 150, or controller module 154, can operate a sequence of processes or steps in response. For example, an initial response to detecting an over voltage condition can include commanding, instructing, or otherwise controllably operating the first switchable element 128 and the second switchable element 132 to open and remain opened for a period of time to cease current conduction to the exciter stator 64. Ceasing the conduction of current in the exciter stator 64 will further cease the power generation at the power output 140. As described herein, the solid state switching elements of the first and second switches 128, 132 are able to operably open very quickly, compared with conventional electromechanical elements, and thus have a very fast response to the detecting of the over voltage condition. Additionally, it will be understood that this initial response can include overriding, overruling, or otherwise superseding the excitation of the exciter stator 64 by way of the gate driver 162.

In some over voltage conditions, however, the initial response may not be enough to subside the over voltage condition. For instance, if there is a short in the H bridge 122, across the first diode 126, across the second diode 130, or if one or more of the switchable elements 128, 130 fails in a closed state, or a combination thereof, control over the exciter stator 54 can be lost and the over voltage condition can continue. Thus, in the event that the over voltage condition continues to exist after the initial response (as detected by the over voltage detectors 164, 166, the over voltage response module 150, or combination thereof), the over voltage response module 150 can include a secondary response.

In one non-limiting example, the secondary response can include detecting, re-detecting, or after an expiration of a predetermined period of time sufficient to allow to over voltage condition to subside in response to the initial response, an additional detecting of an over voltage condition, for example, by way of the over voltage detectors 164, 166 (e.g. a second comparison). Upon confirming or determining the over voltage condition persists, the over voltage response module 150 or the controller module 154 can operably command, instruct, or otherwise controllably operating the third switchable element 137 of the buck converter 136 to operably open, preventing current from conducting to the H bridge 122 and the exciter stator 54 altogether.

In yet some over voltage conditions, however, the initial response, the secondary respond, or a combination thereof, may still not be enough to subside the over voltage condition. For instance, if there is a further electrical short in conductors between the H bridge 122 and the PMG stator 74, if the third switchable element 137 fails in a closed state, or a combination thereof, control over the exciter stator 54 can be lost and the over voltage condition can continue. Thus, in the event that the over voltage condition continues to exist after the initial response, the secondary response, or a combination thereof (as detected by the over voltage detectors 164, 166, the over voltage response module 150, or combination thereof), the over voltage response module 150 can include a tertiary response.

In one non-limiting example, the tertiary response can include detecting, re-detecting, or after an expiration of a predetermined period of time sufficient to allow to over voltage condition to subside in response to the initial response, the secondary response, or a combination thereof, an additional detecting of an over voltage condition, for example, by way of the over voltage detectors 164, 166. Upon confirming or determining the over voltage condition persists (e.g. a third comparison), the over voltage response module 150 or the controller module 154 can operably command, instruct, or otherwise controllably operating the EDR 138 to operably open, preventing current from conducting to the H bridge 122 and the exciter stator 54 altogether.

In yet some over voltage conditions, however, the initial response, the secondary respond, tertiary response, or a combination thereof, may still not be enough to subside the over voltage condition. Thus, in the event that the over voltage condition continues to exist after the initial response, the secondary response, tertiary response, or a combination thereof (as detected by the over voltage detectors 164, 166, the over voltage response module 150, or combination thereof), the over voltage response module 150 can include a fourth response. In one non-limiting example, the fourth response can include detecting, re-detecting, or after an expiration of a predetermined period of time sufficient to allow to over voltage condition to subside in response to the initial response, the secondary response, the tertiary response, or a combination thereof, an additional detecting of an over voltage condition, for example, by way of the over voltage detectors 164, 166. Upon confirming or determining the over voltage condition persists (e.g. a fourth comparison), the over voltage response module 150 or the controller module 154 can operably command, instruct, or otherwise controllably operating the GLC 142 to operably open, preventing current from conducting to the electric power bus 144, and thus, to the electrical loads.

Non-limiting aspects of the disclosure can be included wherein, for example, the over voltage response module 150 is a subcomponent of another generator 14 component, including but not limited to, the GCU 151. Additionally, non-limiting aspects of the over voltage detectors 164, 166 can be incorporated within the over voltage response module 150, the GCU 151, or the like. Additionally, while the aforementioned controllable operations include, sequentially, performing the initial response, the secondary response, and the tertiary response, non-limiting aspects of the disclosure can be included wherein the responses can occur in different permutations or orders, multiple ordered responses can occur simultaneously (for instance, in additional to sequential operations; e.g. primary and secondary responses occur simultaneously, followed by the tertiary response if the over voltage condition persists), or a subset of the responses can be triggered or occur based on a particular over voltage detection condition (e.g. an over voltage condition of greater than 150% nominal voltage detected can generate a different response order, sequence, or simultaneous responses, compared with an over voltage condition of 135% nominal voltage detected).

In yet another non-limiting aspect of the disclosure, only a subset of the switching elements 128, 132, 137 are simultaneously (e.g. non-sequentially) commanded to an open state by the over voltage response module 150. For example, if switching elements 128, 132, 137 were opened simultaneously, current that is flowing in the exciter stator 64 can be directed into the open switching element (e.g. switching element 137) and have nowhere to go except to develop a large voltage across freewheeling diode 139. This large voltage across the freewheeling diode 139 can damage to the semiconductors in the power system. In yet another non-limiting example, switching elements 132 and 128 can further be commanded to close, or re-close, when the over voltage response module 150 commands the EDR 138 to open. This will allow the exciter current to freewheel through freewheeling diode 139 and collapse.

Figure 5:
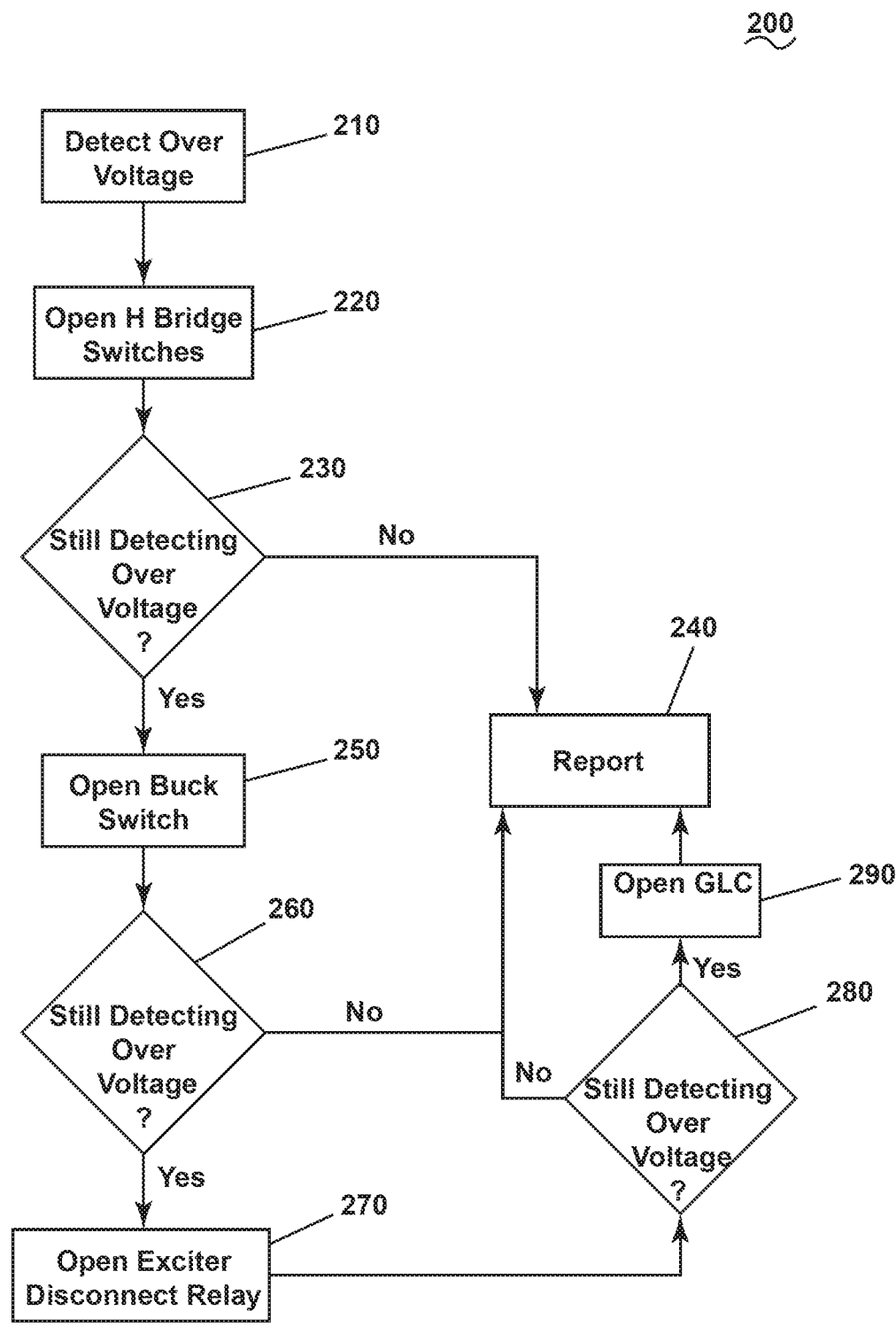
FIG. 5 illustrates an exemplary method flowchart diagram of operating an overvoltage response system for a generator, in accordance with various aspects described herein.

FIG. 5 illustrates a method 200 of detecting or responding to an over voltage condition in a power system. The over voltage condition can be first detected by an understood mechanism, such as the over voltage detectors 164, 166, at 210. Next, the method 200 can initiate the initial response actions at 220, such as the initial response described herein. The method 200 can then determine whether the over voltage condition persists, as described herein, at 230. If the over voltage condition has subsided, the method 200 can proceed to 240, where the over voltage condition can be recorded or reported, for example, in an error or maintenance logging system. The recording or reporting can further generate a maintenance action or activity to evaluate, repair, or inspect the power system in response to the over voltage condition. The recording or reporting can further note that the over voltage condition was subsided by the initial response.

If the over voltage condition persists, the method 200 proceeds to the secondary response at 250. Again, after the secondary response occurs, the method 200 can then determine whether the over voltage condition still persists, as described herein, at 260. If the over voltage condition has subsided, the method 200 can proceed to 240, where the over voltage condition can be recorded or reported, as explained. The recording or reporting can further note that the over voltage condition was subsided by the secondary response.

If the over voltage condition persists, the method 200 proceeds to the tertiary response at 270. Again, after the tertiary response occurs, the method 200 can then determine whether the over voltage condition still persists, as described herein, at 280. If the over voltage condition has subsided, the method 200 can proceed to 240, where the over voltage condition can be recorded or reported, as explained. The recording or reporting can further note that the over voltage condition was subsided by the tertiary response.

If the over voltage condition persists, the method 200 proceeds to the fourth response at 290. The method 200 then proceeds to 240, where the over voltage condition can be recorded or reported, as explained. The recording or reporting can further note that the over voltage condition was subsided by, or caused the fourth response.

Additional aspects of the recording or reporting in 240 are envisioned, in accordance with system procedures, including, but not limited to, aircraft error reporting procedures.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method. For example, in one non-limiting example, the system can operate such that, upon failure of the over voltage response module 150, or related systems thereof, third switchable element 137, the EDR 138, the GLC 144, or a combination thereof, can be commanded to open immediately and unconditionally.

Many other possible aspects and configurations in addition to that shown in the above figures are contemplated by the present disclosure. Additionally, the design and placement of the various power system components can be rearranged such that a number of different in-line configurations could be realized.

The aspects disclosed herein provide method and apparatus for over voltage protection, or a response thereof, of a power system, such as by way of a generator control schema. One advantage that may be realized in the above aspects is that the above described aspects have significantly improved response time or speed in responding to an over voltage condition, compared with conventionally commanding a mechanical or electromechanical relay or contactor to open. By responding faster, the system reduces the likelihood the over voltage condition damages or harms the downstream electrical circuits, electrical loads, or the like. Additionally, by building in redundant responses (e.g. initial response, secondary response, tertiary response, etc.), the system includes reduced likelihood that the over voltage condition cannot be subsided in a desired fashion.

In yet another advantage of the disclosure, the inclusion of the buck converter enables, provides, or otherwise allows for a rapid circuit for returning the elevated voltage levels down to normal or nominal levels in the event of the over voltage condition subsiding. In particular power generation systems, such as a variable frequency generator (VFG), the generator has much less magnetic saturation at high generator rotation speeds. Thus, an internal back electromotive force (BEMF) can be higher in the VFG compared with a constant frequency generator, enabling the internal voltage to be as high as 1.5 to 2.5 times the nominal voltage in an over voltage condition. When designing aircraft components, reliability and redundancy are important features.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An overvoltage response module for an electric machine, comprising:
   an input configured to receive a voltage output value of the electric machine;
   a first output configured to drive a first switchable element at a first leg of an H bridge and a second output configured to drive a second switchable element at a second leg of the H bridge, the H bridge further including an exciter stator of the electric machine disposed between the first leg and the second leg;
   a third output configured to drive a third switchable element upstream of the H bridge;
   a controller module configured to compare the voltage output value with an overvoltage condition of the electric machine, defining a first comparison, and in response to a determination an overvoltage condition exists based on the first comparison:
   controllably operate the first switchable element to open, by way of the first output, and the second switchable element to open, by way of the second output, and after a predetermined period of time, compare the voltage output value with the overvoltage condition of the electric machine, defining a second comparison; and in response to a determination the overvoltage condition exists based on the second comparison, controllably operate the third switchable element to open.

2. The overvoltage response module of claim 1, further comprising a fourth output configured to drive an exciter disconnect relay.

3. The overvoltage response module of claim 2, wherein the controller module is further configured to, after a second predetermined period of time, compare the voltage output value with the overvoltage condition of the electric machine, defining a third comparison, and in response to a determination the overvoltage condition exists based on the third comparison, controllably operate the exciter disconnect relay to open, by way of the fourth output.

4. The overvoltage response module of claim 3, wherein the controller module is configured to controllably operate the first switching element to close, by way of the first output, and the second switchable element to close, by way of the second output, simultaneously when controllably operating the exciter disconnect relay to open, by way of the fourth output.

5. The overvoltage response module of claim 3, further comprising a fifth output configured to drive a line contactor of the electric machine.

6. The overvoltage response module of claim 5, wherein the controller module is further configured to, after a third predetermined period of time, compare the power output value with the overvoltage condition of the electric machine, defining a fourth comparison, and in response to a determination the overvoltage condition exists based on the fourth comparison, controllably operate the line contactor to open, by way of the fifth output.

7. The overvoltage response module of claim 1, further comprising a fourth output configured to drive a line contactor of the electric machine, and wherein the controller module is further configured to, after a second predetermined period of time, compare the power output value with the overvoltage condition of the electric machine, defining a third comparison, and in response to a determination the overvoltage condition exists based on the third comparison, controllably operate the line contactor to open, by way of the fourth output.

8. The overvoltage response module of claim 1, further comprising a fourth output configured to drive an exciter disconnect relay, wherein at least a subset of the first switchable element, the second switchable element, and the third switchable element are solid state switchable element, and wherein the exciter disconnect relay is at least one of an electromechanical switch or a contactor.

9. The overvoltage response module of claim 8 wherein at least a subset of the first switchable element, the second switchable element, and the third switchable element can be operably toggled by the controller module within 10 microseconds.

10. The overvoltage response module of claim 1 wherein the controller module is configured to supersede an excitation of the exciter stator.

11. The overvoltage response module of claim 1 wherein the predetermined period of time is a sufficient period of time to cease current conduction in the exciter stator.

12. A method of operating an overvoltage response in a power system, the method comprising:
receiving a first value representative of a voltage output of an electric machine;
a first comparing of the first value with an overvoltage threshold value representative of an overvoltage condition in the electric machine;
in response to determining an overvoltage condition exists based on the first comparison, controllably opening a first switchable element at a first leg of an H bridge and controllably opening a second switchable element at a second leg of the H bridge, the H bridge further including an exciter stator of the electric machine disposed between the first leg and the second leg;
after a predetermined period of time sufficient to cease current conduction in the exciter stator, receiving an updated value representative of the voltage output of the electric machine; and
a second comparing of the updated value with the overvoltage threshold value representative of the overvoltage condition in the electric machine to ensure the overvoltage condition has ceased.

13. The method of claim 12, wherein, in response to determining the overvoltage condition exists based on the second comparison, controllably opening an exciter disconnect relay.

14. The method of claim 13, wherein, in response to determining the overvoltage condition exists based on the second comparison, simultaneously opening the exciter disconnect relay, closing the first switching element, and closing the second switchable element.

15. The method of claim 13, further comprising:
after a predetermined period of time after the opening of the exciter disconnect relay, receiving an updated value representative of the voltage output of the electric machine; and
a third comparing of the updated value with the overvoltage threshold value representative of the overvoltage condition in the electric machine to ensure the overvoltage condition has ceased.

16. The method of claim 15, wherein, in response to determining the overvoltage condition exists based on the third comparison, controllably opening a line contactor.

17. The method of claim 12 wherein controllably opening the first switchable element and controllably opening the second switchable element occurs within 10 microseconds.

18. An electric machine assembly, comprising:
a voltage output having a sensor configured to sense the voltage output;
a Stator assembly including an H bridge circuit defining a first leg and a second leg, and having an exciter stator disposed between the first leg and the second leg;
a first switchable element disposed in the first leg;
a second switchable element disposed in the second leg;
a third switchable element disposed upstream of the H bridge circuit; a controller module connected with the sensor and configured to compare a sensed voltage output by the sensor with an overvoltage condition of the electric machine, defining a first comparison, and in response to a determination an overvoltage condition exists based on the first comparison:
controllably operate the first switchable element to open and the second switchable element to open, and after a predetermined period of time, compare an updated sensed voltage output by the sensor with the overvoltage condition of the electric machine assembly, defining a second comparison; and in response to a determination the overvoltage condition exists based on the second comparison, controllably operate the third switchable element to open.

19. The electric machine assembly of claim 18, further comprising an exciter disconnect relay, and controllably opening, by the controller module, the exciter disconnect relay, in response to determining the overvoltage condition continues to exist.

20. The electric machine assembly of claim 18, further comprising a generator line contactor, and controllably opening, by the controller module, the generator line contact, in response to determining the overvoltage condition continues to exist.

* * * * *